United States Patent [19]

Berg

[11] 4,279,606
[45] Jul. 21, 1981

[54] EMERGENCY REPLACEMENT PULLEY BELT FOR AUTOMOBILES OR THE LIKE

[76] Inventor: Norman H. Berg, 3295 Parkway Dr., Baldwin, N.Y. 11510

[21] Appl. No.: 107,032

[22] Filed: Dec. 26, 1979

[51] Int. Cl.$^3$ ............................ F16G 3/16; F16G 7/04; F16G 7/06
[52] U.S. Cl. ............................ 474/257; 24/31 B; 24/31 W
[58] Field of Search ............... 474/253, 255, 257; 24/31 B, 31 C, 31 W, 31 R

[56] References Cited

U.S. PATENT DOCUMENTS

| | | | |
|---|---|---|---|
| 391,226 | 10/1888 | Bowden | 474/257 |
| 1,897,221 | 2/1933 | Warner | 474/255 |
| 3,327,359 | 6/1967 | Wiese | 24/31 W |
| 3,680,380 | 8/1972 | Kurrie | 474/257 X |
| 3,732,597 | 5/1973 | Epstein | 24/31 B |
| 3,788,156 | 1/1974 | Jackson | 474/255 |
| 3,834,245 | 9/1974 | Cultrera | 474/257 |
| 4,207,776 | 6/1980 | Helt et al. | 24/31 B X |

Primary Examiner—C. J. Husar
Assistant Examiner—Conrad Berman
Attorney, Agent, or Firm—Bauer & Amer

[57] ABSTRACT

A pulley belt for emergency replacement of a ruptured auto fan or water pump pulley belt in which the pulley belt ends are firmly interconnected to form a closed loop thereof by using wedge blocks to engage an external length of cable molded integral during fabrication of the pulley belt. This manner of connecting the pulley belt ends is not only readily achieved without tools, but is improved strengthwise during power transmission service of the pulley belt by the pulling force exerted on the cable.

3 Claims, 5 Drawing Figures

EMERGENCY REPLACEMENT PULLEY BELT FOR AUTOMOBILES OR THE LIKE

The present invention relates generally to an auto fan or water pump replacement pulley belt, or replacement for a similar operating component of the type in which the replacement is supplied in an initial selected length, entrained over the pulleys involved and then connected end-to-end to thereby form a power-transmitting closed loop, and wherein, more particularly, the invention resides in improvements for achieving said interconnection of said pulley belt ends.

Prior U.S. Patents, such as U.S. Pat. Nos. 3,834,245 and 3,788,156, already recognize the need for a pulley belt construction that can effectively be used as an emergency replacement for a ruptured counterpart to continue the operation of a fan or water pump of an auto, truck or similar vehicle, until the vehicle is driven from the break-down point to a location where the difficulty can be remedied. Prior art replacement pulley belts are not easy to install without tools, or contemplate the destruction of a structural feature thereof during use and thus are only good for one use, or suffer from other such shortcomings.

Broadly, it is an object of the present invention to provide a re-usable, easily installed replacement pulley belt overcoming the foregoing and other shortcomings of the prior art. Specifically, it is an object to use a wedging action in forming a closed loop of the pulley belt, such that the forces exerted on the loop during use contribute to strengthening, rather than forcing apart, the connected pulley ends, all as will soon be described in detail.

An emergency replacement pulley belt demonstrating objects and advantages of the present invention is of the type comprised of a selected length of a pulley belt body of elastomeric construction material having opposite ends in an initial unattached relation. A cable is embodied lengthwise of the pulley belt body and is oversized in relation thereto so that an end-connecting length of the cable extends from one end of the pulley belt body. A cable-gripping member bounding an open-ended compartment is connected adjacent the other end of the pulley belt body. To connect the pulley belt ends, the cable length is projected through the open-ended compartment at a time when the pulley belt body is being formed into a closed loop as it is being placed in entrained relation about a pair of spaced apart pulleys. To complete the connection, use is made of wedge means having an operative position within the compartment in gripping engagement with the end-connecting cable length and oriented so as to be wedged more firmly thereagainst responsive to a pulling force exerted on the cable. In this way, the contemplated emergency use of the pulley belt contributes to completing the connection of the two pulley belt ends, and thus to its emergency installation without the use of any tools.

The above brief description, as well as further objects, features and advantages of the present invention, will be more fully appreciated by reference to the following detailed description of a presently preferred, but nonetheless, illustrative embodiment in accordance with the present invention, when taken in conjunction with the accompanying drawings, wherein.

As is already well known from such prior patents as U.S. Pat. Nos. 3,834,245 and 3,788,156, there is a need for a pulley belt as an emergency replacement for a ruptured conterpart to continue the operation of a fan or water pump of an automobile, truck or similar vehicle, in order to permit the vehicle to be moved from the point of break-down to a service station or other location where the difficulty can be remedied. Even though, as just indicated, the contemplated duration of use of the replacement pulley belt is nominal, it still has to be easy to install in its entrained position over the pulleys and such installation, moreover, should be readily accomplished without any tools, otherwise the underlying convenience and utility of the replacement pulley belt is seriously undermined. Also, the replacement pulley belt should be a stand-by item capable of being used in a number of emergency situations, and thus its construction should not contemplate it being destroyed after only one use. Prior art emergency replacement pulley belts have lacked the aforesaid and other desirable product attributes now possessed, for the first time, by the within replacement emergency pulley belt.

Figure 1:
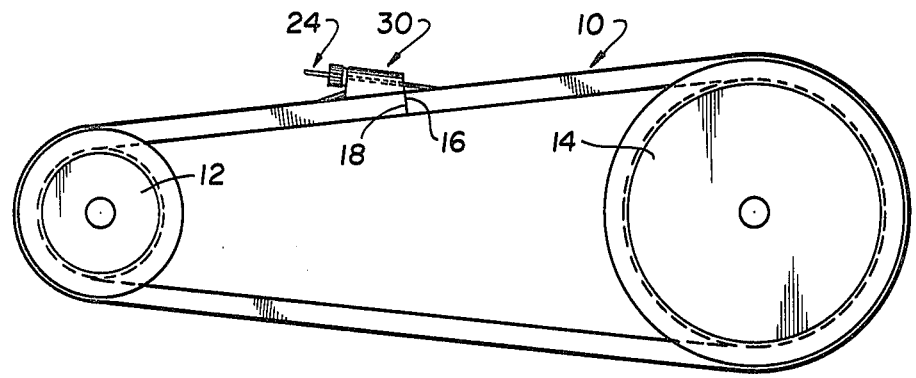
FIG. 1 is an isolated side elevational view illustrating the replacement pulley belt hereof in its installed condition entrained about a cooperating pair of spaced apart pulleys.

More particularly, and as illustrated in FIG. 1, the within pulley belt, generally designated 10, is shown in its installed position as a closed loop entrained about a pair of spaced apart pulleys 12 and 14, which pulleys could be part of the power transmission from the motor to the fan or to the water pump of an automobile, truck or other such vehicle. For present purposes, the specific operating environment of the pulleys 12, 14 is not important except to note that such operation unavoidably occasionally results in the usual pulley belt rupturing. Replacement of this ruptured component should be accomplished without too much difficulty and, most important, without requiring the use of any tools. To accomplish these objectives, both in the prior art and also in regard to the within pulley belt 10, it is contemplated that the pulley belt be supplied in a selected length and with the opposite ends 16 and 18 in an initial unattached relation. The installation of such pulley belt then merely requires the looping of such length in entrained relation over the pulleys 12 and 14 and then interconnecting the ends 16 and 18 to each other. In the prior art, the connecting of the two pulley ends together to form the necessary closed loop thereof has required use of special tools, or has resulted in using a structural feature that through its destruction or otherwise renders it impossible to again use the pulley belt, or results in a connection of such structural weakness that it is doubtful that the emergency duration of service that can be obtained from the belt will be adequate to move the vehicle to a repair site, or suffers from some other such shortcoming. The specific and particular contribution of the within pulley belt 10 is that the pulley belt ends 16 and 18 are firmly interconnected to thereby form a closed loop thereof, that such connection has more than the requisite strength, that it is achieved without destroying any of the structure of the belt and thus the belt can be re-used over and over again, and, most important, that the connection is made simply and without the use of any tools.

To provide the desirable attributes in the pulley belt 10 as just noted, the body thereof, more particularly designated 20, is preferably of an elastomeric construction material and is molded integral with a steel cable 22 that is sized relative to the body 20 so as to provide an externally projecting end-connecting length 24. That is, cable 22 for most of its length is sealed, as noted by the reference numeral 26, during the molding fabrication of the body 20 within body 20 so as to extend lengthwise thereof. It is only at the end portions of the cable 22 that such cable is exposed or is external of the body 20. At one end, namely that adjacent the pulley body end 16, the cable end 28 is thus exposed and the individual strands making up the cable are untwined from each other to provide the fanned out configuration illustrated. Cable end 28 is attached to a connecting member 30, the function and construction of which will soon be described, by being inserted into a compartment 32 which is then filled with lead or babbit 34 through access hole 35. The other cable end is also exposed or external, such end being the already referred to end-connecting length 24 which plays a key role in forming an adequate connection for the belt ends 16 and 18, as will soon be described in detail.

Figure 3:
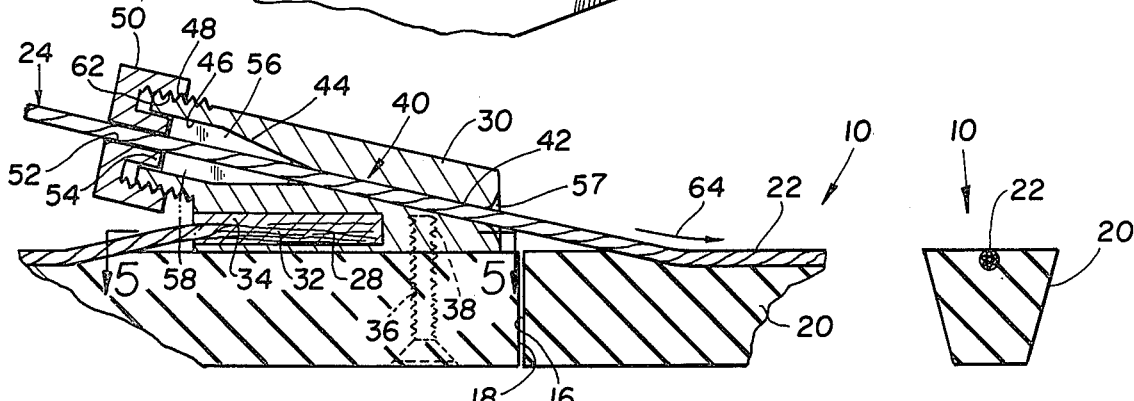
FIG. 3 is a longitudinal section of the connecting structure of FIG. 2 illustrating further structural details thereof.
Figure 4:
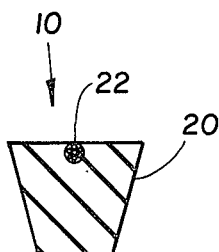
FIG. 4 is a transverse section taken along line 4—4 of FIG. 3 illustrating the manner in which the cable is embodied as part of the pulley belt.
Figure 5:
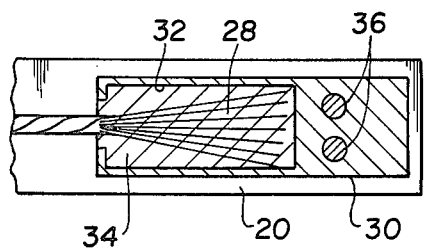
FIG. 5 is a plan view, in section taken along line 5—5 of FIG. 3, illustrating the manner in which one end of the cable is anchored to the pulley belt.

Essential in forming the connection of the pulley belt ends 16 and 18 is the previously noted member 30 which, in its preferred form, is of metal construction material that is attached by a pair of countersunk flat head machine screws 36 that are projected from below through the pulley belt body 20 and tapped, as at 38, to complete a threaded engagement to the member 30. As is perhaps best shown in the cross-sectional view of FIG. 3, member 30 has an angularly oriented through-bore 40 of varying diameters. The smaller diameter section 42 is sized slightly larger than the diameter of the cable 22 while the opposite end 44 of this bore is of a progressively enlarged diameter providing a conically shaped wall bounding an end compartment 46. The external portion of member 30 adjacent compartment 46 is externally threaded, as at 48, and is thus adapted to receive correspondingly threaded knurled screw cap 50, itself having a through-bore 52 and a centrally located pushing hub 54, the function of which will soon be apparent.

Figure 2:
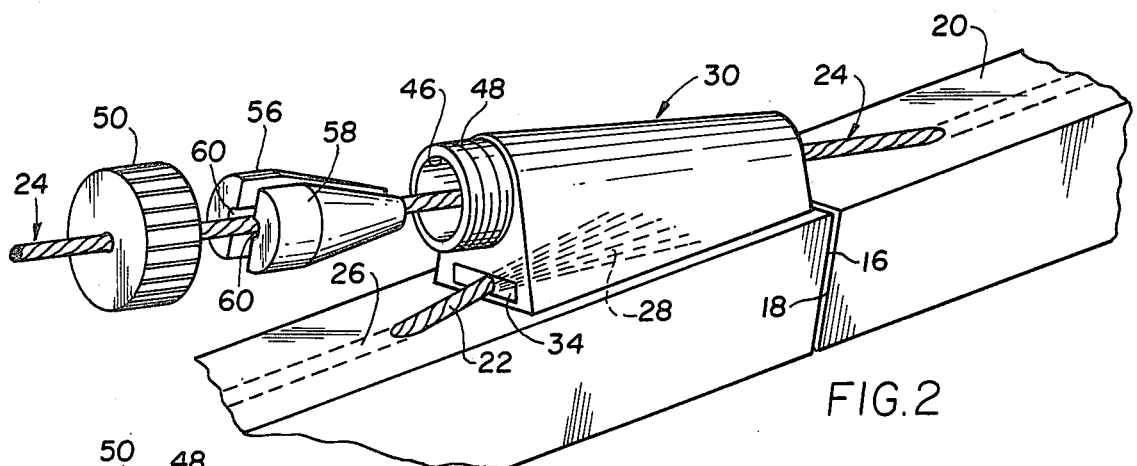
FIG. 2 is a partial perspective view illustrating the components involved in connecting the ends of a length of said pulley belt together to form a closed loop thereof.

Let it now be assumed that the main pulley belt for the pulleys 12 and 14 is ruptured and that the within replacement pulley belt is entrained about these pulleys requiring that the pulley ends 16 and 18 be firmly interconnected without the use of any tools and without entailing any difficult procedures. The manner in which this is achieved is perhaps best described in connection with FIG. 2. More particularly, the adjacent position of the pulley belt ends 16 and 18 also locates the end-connecting cable length 24 in an appropriate position to be projected through the through-bore 40 of member 30. This is facilitated by the countersink 57 machined in the opening into the small diameter portion 42. As may be readily appreciated from FIG. 2, a cooperating pair of conically shaped wedge blocks 56 and 58, each having semicircular lengthwise openings 60 to accommodate the cable length 24, are placed in facing relation to each other and on opposite sides of said cable length 24. In this condition, the blocks 56 and 58 are then inserted into the conical compartment 46. Next, using central opening 52, the cap or closure member 50 is slipped over the cable length 24 and is threadably engaged, as at 62, with the threads 48 of member 30. Threaded manipulation of cap 50 is effective in urging the central hub 54 of the cap in pushing engagement against the wedge blocks 56 and 58 resulting in the blocks firmly engaging the cable length 24. It is, however, a further operating parameter of the within pulley belt 10 that the engagement established between the blocks 56 and 58 and cable length 24 as just described is even more firmly established during use of the pulley belt 10. In this respect, and as is perhaps best illustrated in FIG. 3, during power transmission service of the pulley belt 10, a pulling force 64 is exerted on the cable length 24. It should be readily appreciated that pulling force 64 has a tendency to pull the blocks 56 and 58 deeper into the conically shaped compartment 46 and thus results in the conical wall bounding this compartment camming the blocks 56 and 58 even closer together and thus into more firmly engaged relation with the cable length 24. As a result, the closed loop pulley belt 10 is effective to provide emergency power transmission service until the vehicle on which it is used is delivered to a repair site. At the repair site, cap 50 is threadably removed and the assembly procedure reversed resulting, in turn, in the removal of the pulley belt length 10 from about the pulleys 12 and 14. It should be noted that the condition of the removed pulley belt length 10 contributes to its continued use as a stand-by component to be used as an emergency replacement for a ruptured pulley belt.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. An emergency replacement pulley belt for autos or the like comprising a selected length of a pulley belt body of elastomeric construction material having opposite ends in initial unattached relation, a cable embodied lengthwise of said pulley belt body having a size in relation thereto resulting in a selected end-connecting length of said cable extending from one said end of said pulley belt body, a cable-gripping member bounding an open-ended compartment connected adjacent said other end of said pulley belt body, said end-connecting cable length having an operative position projected through said open-ended compartment of said cable-gripping member so as to form said pulley belt body into a closed loop incident to the placement thereof in entrained relation about a pair of spaced apart pulleys, and wedge means having an operative position in said compartment in gripping engagement with said end-connecting cable length and oriented so as to be wedged more firmly thereagainst responsive to pulling force exerted on said cable, whereby the contemplated emergency use of said pulley belt contributes to completing the connection of the two ends thereof and thus to the emergency installation of said pulley belt without the use of any tools.

2. An emergency replacement pulley belt for autos or the like as claimed in claim 1 wherein said wedge means is comprised of a cooperating pair of semi-circular shaped wedge blocks disposed in facing relation on opposite sides of said cable length within said compartment, and wherein there is further provided a closure for said compartment for obviating inadvertent dislodgement of said blocks from said compartment.

3. An emergency replacement pulley belt for autos or the like as claimed in claim 2 wherein the remote end of said compartment has a threaded portion, and said closure is correspondingly threaded so as to be placed in threaded engagement with said threaded portion, whereby threaded adjustment of said closure is adapted to result in pushing contact against said wedge blocks to thereby contribute to the wedging thereof from opposite sides against said cable.

* * * * *